United States Patent [19]

Orgovan

[11] Patent Number: 5,179,336
[45] Date of Patent: Jan. 12, 1993

[54] METHOD FOR DECREASING THE SPEED OF AN ALTERNATING CURRENT MOTOR

[75] Inventor: Andrew J. Orgovan, Milwaukee, Wis.

[73] Assignee: Harnischfeger Corporation, Brookfield, Wis.

[21] Appl. No.: 726,494

[22] Filed: Jul. 8, 1991

[51] Int. Cl.[5] ............................................. H02P 7/42
[52] U.S. Cl. .................................... 318/758; 318/808; 318/810
[58] Field of Search ............... 318/757, 758, 807, 810, 318/362, 808

[56] References Cited

U.S. PATENT DOCUMENTS

| | | |
|---|---|---|
| 3,671,831 | 6/1972 | Chausse et al. . |
| 4,091,294 | 5/1978 | Zankl et al. . |
| 4,099,108 | 7/1978 | Okawa et al. . |
| 4,672,285 | 6/1987 | Ito ............................. 318/757 |
| 4,749,933 | 6/1988 | Ben-Aaron ..................... 318/810 |
| 4,761,600 | 8/1988 | D'Atre et al. .................. 318/759 |
| 4,855,661 | 8/1989 | Okamoto et al. ............... 318/807 |
| 4,965,847 | 10/1990 | Jurkowski et al. ............. 318/814 |

Primary Examiner—Bentsu Ro
Attorney, Agent, or Firm—Richard C. Ruppin

[57] ABSTRACT

The invention is carried out by providing an adjustable frequency power supply connected to an alternating current induction motor which is rotated at speeds in excess of 60 hertz. A plurality of sequential frequency ranges are selected which, together, comprise a total frequency range from a maximum frequency range in excess of 60 hertz to 60 hertz which is applied to the motor. For each frequency range, a maximum breakdown torque of the motor is determined. When it is desired to decrease the speed of the motor, it is decelerated sequentially through each frequency range at a different deceleration rate for each range such that the maximum breakdown torque of the motor within each frequency range is not exceeded. Each different deceleration rate for each frequency range is determined by selecting the minimum period of time, for each frequency range, during which the motor may be decelerated without exceeding the maximum breakdown torque of the motor within that frequency range. Also, the deceleration rate for each frequency range may be selected by determining the deceleration rate of the motor at the highest frequency in each range which will not result in exceeding of the maximum breakdown torque of the motor. The motor is then decelerated within each range at the deceleration rate of the highest frequency in the range.

9 Claims, 3 Drawing Sheets

METHOD FOR DECREASING THE SPEED OF AN ALTERNATING CURRENT MOTOR

FIELD OF THE INVENTION

This invention relates to an alternating current motor drive system having controlled motor deceleration. More particularly, the invention relates to controlling the deceleration of an alternating current induction motor operating at speeds in excess of 60 hertz.

BACKGROUND OF THE INVENTION

In the area of adjustable frequency drives for alternating current induction motors, the driving of the motors at frequencies above the rated 60 hertz frequency of the motors is desirable to increase productivity of the motors and driven equipment. However, at higher frequencies, the rated torque and rated breakdown torque of the motor decrease significantly. Such lower torque levels are of particular importance in driven equipment where loss of load control can result in facility damage and injury to personnel.

Various provisions have consequently been developed to protect against inadequate torque levels when running motors at speeds in excess of 60 hertz. However, one of the areas for which there has been little development is the efficient and safe operation during deceleration of alternating current motors from speeds above 60 hertz down to 60 hertz. Presently, alternating current motors operating above 60 hertz are decelerated at a rate at which the torque required by the load will not be greater than the lowest torque level available during the deceleration down to a speed of 60 hertz. This torque level will be the rated breakdown torque of the motor at its highest speed at the initiation of deceleration. This, of course, is the lowest rated breakdown torque level during deceleration. Decelerating the motor at a rate that does not require a load controlling torque greater than the lowest rated breakdown torque level will be the slowest deceleration rate possible. Obviously, decelerating the motor in this manner is not particularly productive.

SUMMARY OF THE INVENTION

It is a general object of this invention to provide, in an adjustable frequency motor drive system for an alternating current motor, a method for decreasing the speed of the motor at a maximum deceleration rate without losing control of any load on the motor. It is a further object of the invention to provide a method for decelerating the motor at a variable, increasing rate in the constant horsepower operating region of the motor above frequencies of 60 hertz.

The invention is carried out by providing an adjustable frequency power supply connected to an alternating current induction motor which is rotated at speeds in excess of 60 hertz. A plurality of sequential frequency ranges are selected which, together, comprise a total frequency range from a maximum frequency range in excess of 60 hertz to 60 hertz which is applied to the motor. For each frequency range, a maximum breakdown torque of the motor is determined. When it is desired to decrease the speed of the motor, it is decelerated sequentially through each frequency range at a different deceleration rate for each range such that the maximum breakdown torque of the motor within each frequency range is not exceeded. Each different deceleration rate for each frequency range is determined by selecting the minimum period of time, for each frequency range, during which the motor may be decelerated without exceeding the maximum breakdown torque of the motor within that frequency range. Also, the deceleration rate for each frequency range may be selected by determining the deceleration rate of the motor at the highest frequency in each range which will not result in exceeding of the maximum breakdown torque of the motor. The motor is then decelerated within each range at the deceleration rate of the highest frequency in the range.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
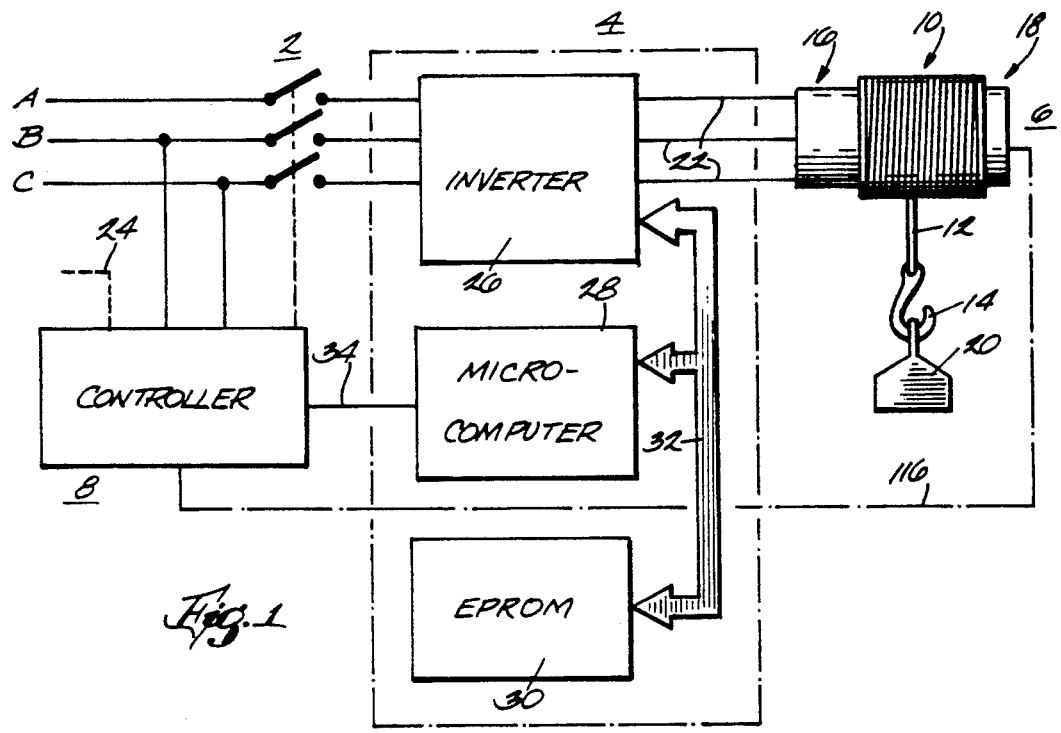
FIG. 1 is a schematic diagram of an adjustable frequency drive apparatus in which the method of the invention may be carried out.

Referring generally to FIG. 1, switch means 2 is illustrated which includes three switch contacts for connecting three phase, 60 hertz power from lines A, B and C to an adjustable frequency power supply 4 which, in turn, provides power to a hoist 6. A controller 8 including an operating lever 24 provides input signals to the power supply 4 for operating the power supply and hoist. The hoist 6 comprises a drum 10, a motor 16 which drives the drum 10, and a brake 18 for stopping or holding the drum 10. A cable 12 having a hook 14 at its lower end is affixed to the drum 10 and may be wound onto or paid out from the drum 10 to lower or raise an object such as load 20 carried by the hook. The motor 16 preferably a three phase squirrel-cage induction type which may, for example, have a rated synchronous speed of 1200 rpm at 60 hertz. An alternating current three phase power supply is provided to the motor 16 on lines 22 from the adjustable frequency power supply 4. The motor 16 drives the drum 10 through gear means (not shown) in a rotational direction to either wind the cable 12 onto the drum 10 and raise the load 20 or pay the cable 12 out from the drum 10 and lower the load 20. The rotational direction of the motor 16 and thereby the raising or lowering of the load 20 is determined by the phase sequence of the three phase power supply on the lines 22. The brake 18 is spring held in a normally applied or on condition and is connected to an appropriate power source through a contact in the controller 8 which controls the release of the brake 18. The brake 18 operates to stop and hold the drum 10 from rotating to thereby hold the load 20 suspended when the motor 16 is not operating to raise or lower the load. The switch means 2, the adjustable frequency power supply 4, the hoist 6 and its components, such as the drum 10, motor 16 and brake 18, are all well-known devices and will not be further described herein except as necessary to describe the instant invention.

The adjustable frequency power supply 4 includes an inverter 26, a microcomputer 28 and an EPROM 30, all connected together by a bus 32. Information in digital signal form is transferred between the microcomputer 28, EPROM 30 and inverter 26 on the bus 32. The microcomputer 28 is also connected to the controller 8 via a line 34 representing a number of line electrical connections for transmitting information signals directing the control of the microcomputer 28 and the controller 8. The microcomputer 28 includes a microprocessor, a memory, and input and output units which are well-known type of devices and are not shown, and which receive or transmit information on the bus 32 and lines 34, and process and convert from one form to another the information received to provide control instructions to the inverter 26, EPROM 30, signal converter 8 and controller 8 for the operation of the hoist 6.

The EPROM 30 contains a program for controlling the operation of the hoist 6 in conjunction with signals received by the microcomputer 28 from the controller 8 and the inverter 26. The output of the inverter 26 is a three phase selectively variable frequency output $F_{out}$ on the lines 22 to the motor 16. The inverter 26 is of a well-known type in which the three phase power input is rectified to full wave direct current power and then converted to three phase alternating current power output at a constant voltage to frequency ratio and at a frequency which may be varied and controlled by input signals from the microcomputer 28. The phase sequence of the alternating current power supply on lines 22, which controls the direction of rotation of the drum 10, is directed by a signal from the controller 8 on the lines 34 to the microcomputer 28.

Figure 3:
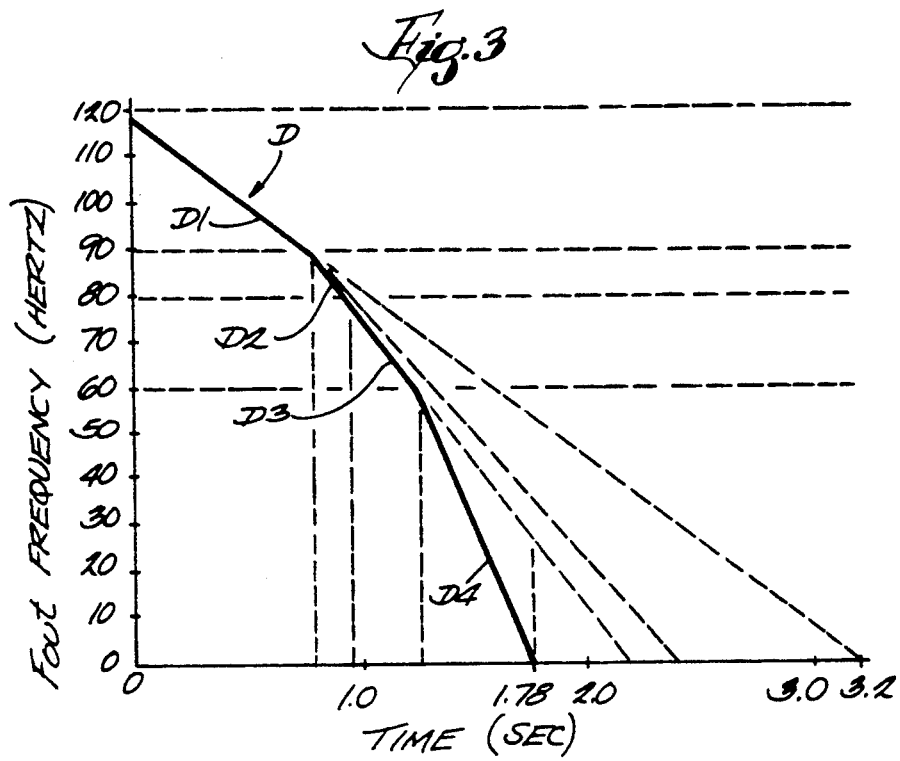
FIG. 3 is a graph of a frequency versus time curve during deceleration of an alternating current induction motor.

In operating the hoist 6 to decrease its speed or bring it to a stop, the inverter 26 may be controlled to decrease the frequency $F_{out}$ at varying rates depending on the frequency $F_{out}$ being supplied to the motor 6. For example, as shown in FIG. 3, illustrating a deceleration curve D of frequency $F_{out}$ versus time, deceleration from maximum speed of the motor 6 at an $F_{out}$ frequency of 120 hertz to zero speed at zero hertz takes place at four increasingly faster deceleration rates illustrated by separate segments D1, D2, D3 and D4 of the curve D. The deceleration rates D1, D2, D3 and D4 respectively cover frequency ranges of or are between frequencies of A (120 hertz) to B (90 hertz), B to C (80 hertz), C to D (60 hertz), and D to E (0 hertz). As will be discussed in greater detail hereinafter, the use of the different deceleration rates permits the speed decreasing or stopping of the hoist in a minimum length of time.

Figure 2A:
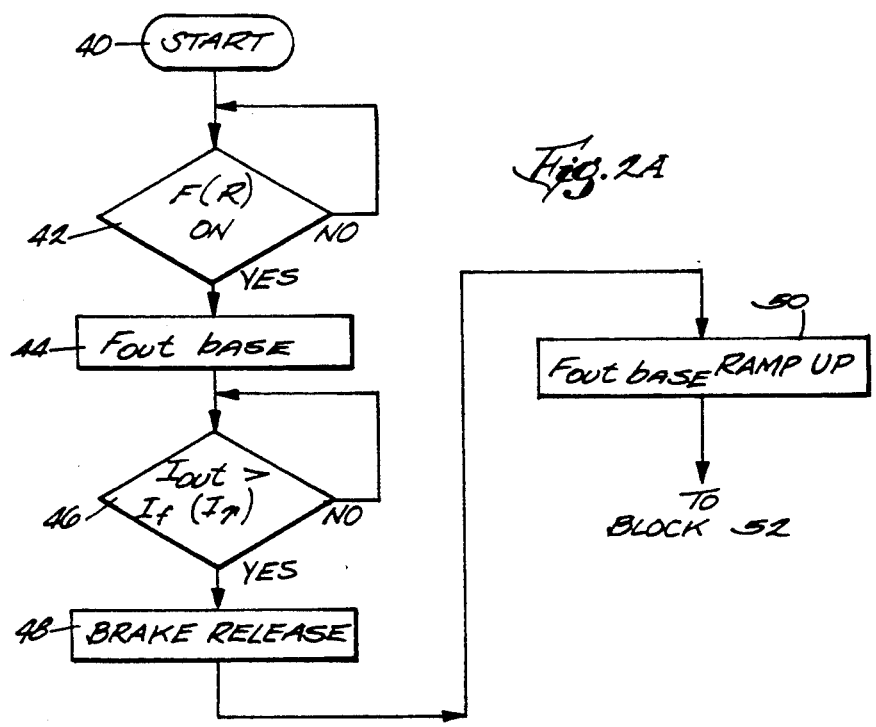
FIGS. 2A and 2B are sequence flow charts illustrating the operation sequence of the method of the invention.
Figure 2B:
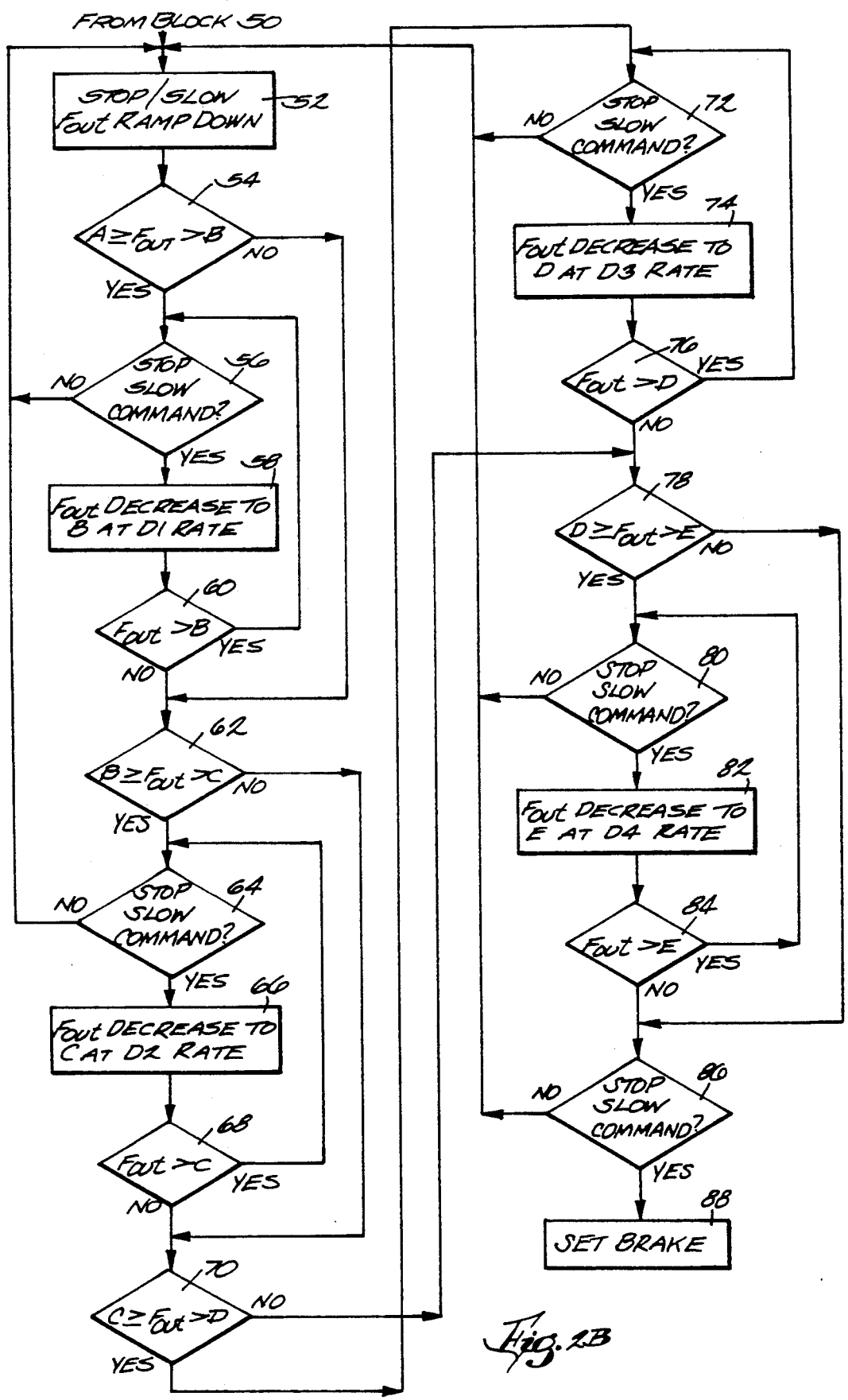

Operation of the apparatus is initiated by closing an appropriate switch comprising part of the controller 8 which causes closing of the contacts of switch means 2 and the providing of control power to the controller 8 and the adjustable frequency power supply 4. Alternating three phase power is also provided through the switch means 2 to the inverter 26. With reference to FIG. 2A, the apparatus is now in the start mode indicated by block 40. The operating lever 24 of the controller 8 may now be moved to command a forward hoist raising operation or a reverse hoist lowering operating at a speed, i.e., frequency, selected by the operating person which may, for example, be up to 120 hertz or approximately 2400 rpm of the motor 16. In response to movement of the lever 24, the controller 8 provides signals on line 34 to the microcomputer 28 indicating the speed and the forward or reverse direction being requested. With reference to FIG. 2A, whether either a forward or reverse operation is being requested is determined by the microcomputer 28 as shown by the decision block 42 containing the letter "F" designating forward and the letter "R" designating reverse. If the apparatus is in a start mode, but a forward or reverse operation is not being requested, the microcomputer loops the operating sequence back to make the determination again. If a forward or reverse operation is being requested, the operating sequence moves on to block 44.

The function block 44 indicates the generation of power by the inverter 26 at a low initial frequency $F_{out}$ base while the level of the inverter output current is being monitored to determine adequate current level to enable a minimum motor torque. The monitoring of the inverter current $I_{out}$ is represented at decision block 46 indicating that the current $I_{out}$ is compared with reference currents $I_f$ or $I_r$, respectively necessary for minimum torque in the hoist raising or lowering direction. If the value of $I_f$ or $I_r$ is greater than the value of $I_{out}$, then the sequence will loop back and be repeated, as shown in the decision block 46 of FIG. 2A. If the value of $I_{out}$ is greater than the value of $I_f$ or $I_r$, then a brake release operation will take place as indicated in block 48 of FIG. 2A. After release of the brake, the operation sequence then moves on to increasing or ramping the output frequency on lines 22 from an initial low frequency level $F_{out\ base}$ level up to the previously requested output frequency $F_{out}$, as indicated in block 50 of FIG. 2A. Assuming that a 120 hertz frequency has been selected by the appropriate positioning of the lever 24, the hoist 6 is now in a run condition, in a raising or lowering direction, at a 120 hertz frequency $F_{out}$ corresponding to a motor speed of approximately 2400 rpm, depending on the amount of slip.

While the hoist is running in either a raising or lowering direction, if it is desired to stop or decrease the speed of the hoist, the lever 24 may be moved to a stop position so that a stop signal is sent from the controller 8 to the microcomputer 28 to decrease or ramp down the frequency $F_{out}$. Following the stop signal, the frequency $F_{out}$ is monitored as shown at function block 54 to determine whether it is between the higher frequencies A and B. If the frequency $F_{out}$ is equal to frequency A or between the frequencies A and B, the presence of the stop command is confirmed at decision block 56. If the stop command continues to be present, the frequency $F_{out}$ is decreased to frequency B at the D1 deceleration rate by an appropriate instruction from the microcomputer to the inverter 26. In response, the inverter 26 decreases the frequency of the power supplied to the motor 16 on the lines 22. Returning to the decision block 54, if the comparison of the frequency $F_{out}$ indicates that it is not greater than frequency B, that is, it is equal to or less than frequency B, the sequence moves on to decision block 62. If the confirmation of the stop/slow command at decision block 56 indicates that that command is no longer present because, for example, the lever 24 has been moved to maintain a speed without change or to increase speed, the sequence will move back to block 52. At block 52, if no stop/slow command is being provided on the controller 8, the inverter will continue to produce a frequency $F_{out}$ to maintain whatever speed is being requested. Following the decrease of the frequency $F_{out}$ to frequency B indicated at block 58, the sequence moves to decision block 60 where the frequency is again checked to determine whether it has, in fact, decreased to frequency B. If the frequency $F_{out}$ has not decreased to frequency B, the sequence is looped back to decision block 56 where a stop/slow command is again confirmed and the command to decrease the frequency $F_{out}$ to frequency B at block 58 is repeated. If the frequency $F_{out}$ at decision block 60 is less than frequency B, the sequence moves to decision block 62 where the comparison of frequency $F_{out}$ is made to determine whether it is less than or equal to frequency B and greater than frequency C. This comparison is also made if the sequence has moved from decision block 54 to decision block 62. If the frequency is not greater than frequency C, the sequence moves to decision block 70. If the frequency comparison requirement of block 62 is satisfied, the sequence moves to the stop/slow command decision block 64 where the function of block 64 is carried out in the same manner as the function of block 56. If the sequence moves to function block 66, the frequency $F_{out}$ is decreased to frequency C at the D2 deceleration rate and then the frequency $F_{out}$ is checked at decision block 68 to determine whether it has, in fact, decreased to frequency C. If $F_{out}$ is not greater than frequency C, the sequence loops back to decision block 64 and function block 66. If the frequency $F_{out}$ is equal to or less than frequency C, the sequence moves on to decision block 70 where the frequency $F_{out}$ is compared with frequency D and frequency C. If it is between these reference frequencies or equal to frequency C, the sequence moves on to decision block 72 and function block 74. If the comparison at decision block 70 is not satisfied, the sequence moves to decision block 78. The decision block 72 functions to confirm that a stop/slow command is still present in the same manner as blocks 56 and 64 and, if the command is still present, the frequency $F_{out}$ is decreased to frequency D at the D3 deceleration rate as indicated at function block 74. When the deceleration of frequency $F_{out}$ indicated at block 74 is completed, the frequency $F_{out}$ is compared to frequency D at decision block 76 and if the frequency $F_{out}$ is still greater than frequency D, the sequence loops back to blocks 72 and 74. If the frequency $F_{out}$ is equal to or less than frequency D, the sequence continues on to decision block 78 where the frequency $F_{out}$ is compared with frequencies D and E. If the frequency $F_{out}$ is equal to less than frequency E. the sequence is moved ahead to decision block 86. If the frequency $F_{out}$ satisfies the comparison of decision block 78, the sequence continues to the stop/slow command decision block 80 which confirms the presence of the stop/slow command. If the slow/stop command is still present, the sequence continues to the function block 82 where the frequency $F_{out}$ is decreased to frequency E which is zero frequency, at the D4 deceleration rate. At decision block 84, the frequency $F_{out}$ is compared with the zero frequency F. If the frequency $F_{out}$ is not yet at frequency E, the sequence is looped back to decision block 80. If frequency $F_{out}$ is equal Lo frequency E, the sequence continues on to decision block 80 to confirm the presence of the stop/slow command. If that command is not present, the sequence moves back to the function block 52 in the same manner as described with reference to the other stop/slow command decision blocks. If the stop/slow command continues to be present, the sequence moves on to set the brake 18 of the motor as indicated at function block 88. Setting the brake, of course, stops the hoist.

Figure 4:
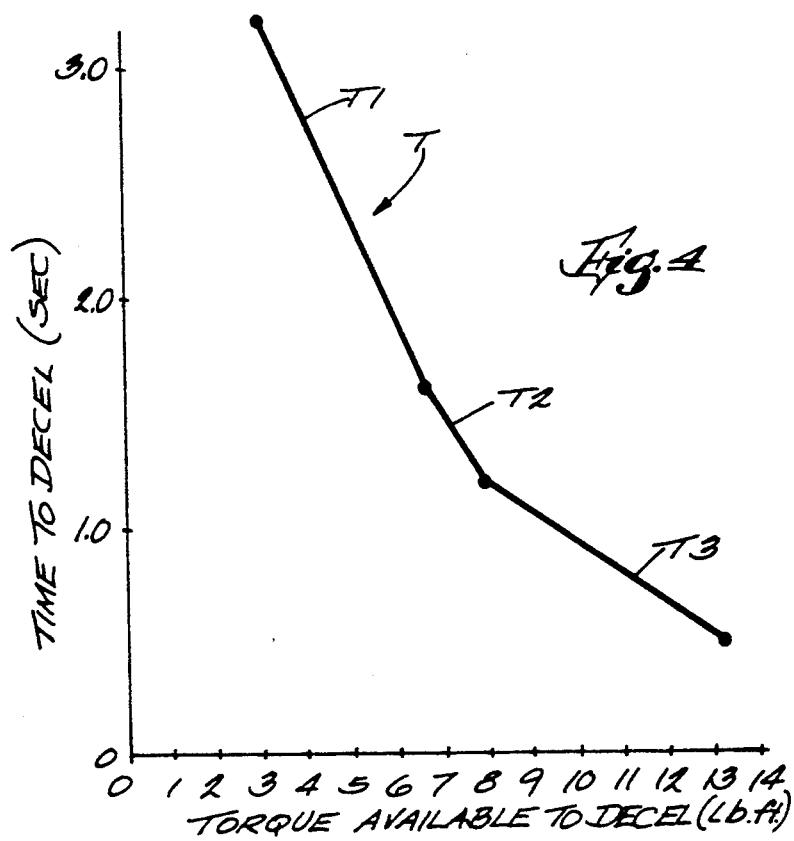
FIG. 4 is a graph of a time versus torque curve during deceleration of a motor in accord with the graph shown in FIG. 3.

Referring again to FIG. 3, and also to FIG. 4 illustrating a curve T of torque available during deceleration time, the curves illustrated are for a 1.5 h.p. motor and include a breakdown torque safety factor of 20%. In FIG. 3, the deceleration rates identified by curve segments D1, D2, D3 and D4 respectively corresponding to frequency ranges of 120-90 hertz, 90-80 hertz, 80-60 hertz and 60-0 hertz, are the fastest deceleration rates that can be permitted while still producing sufficient rated breakdown torque at frequencies respectively of 120 hertz, 90 hertz, 80 hertz and 60 hertz. The relatively quick deceleration and consequent increased productivity using the four increasingly faster deceleration rates can be seen from the time coordinate of FIG. 3 indicating a total time to decelerate from 120 hertz to 0 hertz of 1.78 seconds along curve D. On the other hand, if the maximum deceleration rate D1 which is possible at 120 hertz, the beginning deceleration speed, is followed all the way to 0 hertz, the total time to decelerate would be 3.2 seconds, nearly twice as long as the deceleration time following curve D. The rapid deceleration available with the different deceleration rates D1, D2, D3 and D4 can, of course, be also advantageously used when the hoist 6 is not necessarily brought to a stop, but is merely decelerated to a slower speed while manipulating or maneuvering the load 20.

The deceleration rates of the motor shown in FIG. 3 is dependent on the breakdown torque available as the motor operating frequency is decreased from one range to another. The full load torque $T_{FL}$ of the exemplary 1.5 h.p. motor for the hoist is 6.7 lb. ft. Typical breakdown torque $T_{BD}$ for this motor is 220% of $T_{FL}$ at 60 hertz or 11.8 lb. ft., including a 20% safety factor. Using the well-known relationship that $T_{BD}$ at frequencies $F_x$ above 60 hertz are equal to $T_{FL} \times (60/F_x)^2$, the $T_{80}$ including a 20% safety factor at frequencies of 80 hertz, 90 hertz and 120 hertz are respectively 6.6 lb. ft., 5.3 lb. ft. and 3.0 lb. ft. The torque available from the motor for deceleration purposes includes the total of the torque necessary to run the motor in a steady state condition $T_{SS}$ plus the breakdown torque $T_{BD}$. For the exemplary 1.5 h.p. motor, $T_{SS}$ is essentially a constant 1.4 lb. ft. at all running frequencies. Thus, the torque available for deceleration $T_D$ at frequencies of 120 hertz, 90 hertz, 80 hertz and 60 hertz is respectively 4.4 lb. ft., 6.7 lb. ft., 8.0 lb. ft. and 13.2 lb. ft. The deceleration times to for the exemplary motor to decelerate from one speed to another with the available deceleration torques $T_D$ can be calculated from the equation $$t_D = \frac{WK^2 \times \Delta \text{rpm}}{308 \times T_D}$$

where $WK^2$ and 308 are constants and $\Delta$ rpm is the multiple of the ratio of the frequency above 60 hertz to 60 hertz and the motor speed in rpm at 60 hertz. For speed decreases to 0 hertz from 120 hertz, 90 hertz, 80 hertz, and 60 hertz, the calculated deceleration times $t_D$ are respectively 3.2 second, 1.6 second, 1.2 second, and 0.5 second. These deceleration times and the torques available during the deceleration times are shown in FIG. 4 in which three segments T1, T2 and T3 of the curve T represent time periods and deceleration torque $T_D$ available during the time periods. However, if the deceleration rate is increased, that is, made faster, at 90 hertz, 80 hertz and 60 hertz, the deceleration will be the total of 0.8 second (90/120 of 3.2 second), 0.18 second (80/90×1.6 second), 0.3 second (60/80×1.2 second), and 0.5 second, for a total deceleration time of 1.78 second, as shown in FIG. 3.

In decelerating the frequency $F_{out}$ supplied by the inverter to the motor 16 and thereby decelerating the speed of the motor, the fastest overall deceleration rate from 120 hertz to 60 hertz can be obtained by following the time/torque curve T in FIG. 4 as closely as possible. On the other hand, if the deceleration rate from 120 hertz to 60 hertz is too rapid, a higher value of torque would be required to control the load than is available at any particular frequency and the motor 16 would consequently lose control of the load 20. In essence, the torque required would be at a value greater than that available along the curve shown in FIG. 4. The (time-/torque) ranges or segments T1, T2 and T3 shown in FIG. 4 and the corresponding frequency segments of FIG. 3 are chosen on the basis of a desired total deceleration time. If faster deceleration of the motor and hoist than that shown in FIGS. 3 and 4 is desired, smaller frequency deceleration ranges may be chosen down to very small frequency increments, such as 1 hertz increments. However, in choosing deceleration rate ranges or increments, the rates must always be such that the rate does not require a larger amount of motor torque than is available within that frequency range or increment.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A method of decelerating an a.c. induction motor rotating at a speed in excess of 60 hertz and connected to an adjustable frequency alternating current power supply, comprising the steps of:
   selecting a plurality of sequential frequency ranges which together comprise the total frequency range from the maximum frequency in excess of 60 hertz applied to the motor to 60 hertz;
   determining the deceleration torque of the motor within each frequency range; and
   decelerating the motor sequentially through each frequency range at a different deceleration rate for each range such that the deceleration torque of the motor within each frequency range is not exceeded.

2. The method according to claim 1 wherein the step of decelerating the motor is accomplished by decelerating the motor at an increased deceleration rate for each sequential lower frequency range.

3. The method according to claim 1 wherein the step of decelerating the motor is accomplished by increasing the deceleration rate at the juncture of each frequency range.

4. The method according to claim 3 comprising the further step of:
   sensing the actual frequency of the power supplied to the motor and producing an actual frequency signal representative of the actual frequency;
   producing pairs of frequency range reference signals each representative of one of the plurality of frequency ranges;
   comparing the actual frequency signal with the pairs of frequency range signals and, when the actual frequency signal is within any one of the pairs of frequency range signals, producing an output signal so indicating; and
   in response to the output signal, decreasing the frequency of the power supplied to the motor at the frequency deceleration rate for said one frequency range.

5. The method according to claim 1 comprising the further step of selecting a deceleration rate for each frequency range by determining the deceleration rate of the motor at the highest frequency in each said range which will not result in the exceeding of the deceleration torque of the motor and decelerating the motor within each range at said deceleration rate of the highest frequency in the range.

6. A method of decelerating an a.c. induction motor rotating at a speed in excess of 60 hertz and connected to an adjustable frequency alternating current power supply, comprising the steps of:
   determining deceleration torque available from the motor at selected frequencies during deceleration of the motor;
   determining the deceleration time to decelerate the motor from each of the selected frequencies to zero frequency without exceeded the deceleration torque available to each selected frequency; and
   controlling the adjustable frequency power supply to provide power at a decreasing frequency to the motor enabling the motor to sequentially produce the deceleration torque available during the deceleration time while decreasing frequency from a first one to a second one of the selected frequencies and the deceleration torque available during the deceleration time while decreasing frequency from said second one to a third one of the selected frequencies.

7. The method according to claim 6 wherein the step of controlling the adjustable frequency power supply includes decreasing the frequency of the power to the motor from a first one to a second one of the selected frequencies during a deceleration time such that the deceleration torque is at least that available at the first one of the selected frequencies and decreasing the frequency of the power to the motor from the second one to the third one of the selected frequencies during a deceleration time such that the deceleration torque is at least that available at the second one of the selected frequencies.

8. The method according to claim 6 wherein the step of determining the deceleration time comprises determining the deceleration time to decelerate the motor from at least one of the selected frequencies to zero frequency at the deceleration torque available at the selected frequency.

9. The method according to claim 6 comprising the further step of:
   sensing the value of the decreasing frequency of the power to the motor and producing a frequency signal in response to the decreasing frequency reaching each one of the selected frequencies; and
   deceasing the deceleration time to decrease the frequency of the power supplied to the motor from each one of the selected frequencies to zero frequency in response to the frequency signal.

* * * * *